United States Patent
Jung et al.

(10) Patent No.: US 11,655,714 B2
(45) Date of Patent: May 23, 2023

(54) VANE AND COMPRESSOR AND GAS TURBINE HAVING THE SAME

(71) Applicant: DOOSAN ENERBILITY CO., LTD, Changwon-si (KR)

(72) Inventors: Young Jin Jung, Pyeongtaek-si (KR); Jun Hyuk Seo, Pohang-si (KR); Sung Ryong Lee, Daegu (KR); Jae Woo Choi, Changwon-si (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 263 days.

(21) Appl. No.: 16/895,261

(22) Filed: Jun. 8, 2020

(65) Prior Publication Data
US 2021/0054742 A1 Feb. 25, 2021

(51) Int. Cl.
*F01D 5/06* (2006.01)
*F01D 5/14* (2006.01)
*F02C 3/05* (2006.01)

(52) U.S. Cl.
CPC ............. *F01D 5/066* (2013.01); *F01D 5/142* (2013.01); *F02C 3/05* (2013.01); *F05D 2220/32* (2013.01); *F05D 2240/12* (2013.01); *F05D 2240/40* (2013.01)

(58) Field of Classification Search
CPC ........ F01D 5/14; F01D 5/141; F05D 2240/12; F05D 2240/121; F05D 2240/122; F05D 2240/123; F05D 2240/124; F05D 2250/32; F05D 2250/322; F05D 2250/71; F05D 2250/711; F05D 2250/712; F05D 2250/73; F04D 29/544
See application file for complete search history.

(56) References Cited

U.S. PATENT DOCUMENTS

| 3,976,399 | A | * | 8/1976 | Schmoch | F01D 5/066 |
| | | | | | 416/198 A |
| 4,832,568 | A | * | 5/1989 | Roth | F01D 9/042 |
| | | | | | 415/189 |
| 4,941,803 | A | * | 7/1990 | Wainauski | B64C 11/18 |
| | | | | | 416/223 R |

(Continued)

FOREIGN PATENT DOCUMENTS

EP 3343024 A1 4/2018

OTHER PUBLICATIONS

Office Action issued by Korea Patent Office dated Sep. 18, 2020.

*Primary Examiner* — Courtney D Heinle
*Assistant Examiner* — Danielle M. Christensen
(74) *Attorney, Agent, or Firm* — Harvest IP Law LLP

(57) ABSTRACT

A compressor vane is provided. The compressor vane may include a first surface directed toward air introduced into a compressor, a second surface directed in a direction opposite to the first surface, and two tangent lines in which the first and second surfaces meet, wherein a rate of change, with respect to a height of the compressor vane, of a maximum separation distance, between the first surface and the second surface, divided by a distance from one to the other of the two tangent lines in a cross-section at one position of the height of the compressor vane in a direction starting from a portion of the compressor vane closest to a center tie rod and toward a compressor housing varies with the height of the compressor vane away from the portion of the compressor vane closest to the center tie rod.

17 Claims, 6 Drawing Sheets

(56) References Cited

U.S. PATENT DOCUMENTS

| | | |
|---|---|---|
| 6,905,309 B2 | 6/2005 | Nussbaum et al. |
| 7,785,074 B2 | 8/2010 | Novori et al. |
| 8,221,065 B2 * | 7/2012 | Greim .................. F01D 5/141 |
| | | 416/243 |
| 8,573,945 B2 | 11/2013 | Wang et al. |
| 10,309,241 B2 * | 6/2019 | Bailey ................. F04D 27/009 |
| 10,907,648 B2 * | 2/2021 | Vogiatzis .............. F04D 29/325 |
| 2016/0160874 A1 * | 6/2016 | Lamicq ................ F01D 17/162 |
| | | 29/889.7 |
| 2018/0252231 A1 | 9/2018 | Northall et al. |
| 2020/0018178 A1 * | 1/2020 | Radomski .............. F01D 5/141 |

\* cited by examiner

VANE AND COMPRESSOR AND GAS TURBINE HAVING THE SAME

CROSS-REFERENCE TO RELATED APPLICATION

This application claims priority to Korean Patent Application No. 10-2019-0103868, filed on Aug. 23, 2019, the disclosure of which is incorporated herein by reference in its entirety.

BACKGROUND

Technical Field

Apparatuses and methods consistent with exemplary embodiments relate to a vane, and a compressor and gas turbine having the same, and more particularly, to a vane that enables an increase in structural stability and an improvement in aerodynamic performance, and a compressor and gas turbine having the same.

Description of the Related Art

A gas turbine is a power engine that mixes air compressed by a compressor with fuel, combusts the mixture of the compressed air and the fuel, and rotates a turbine using high-temperature gas produced by the combustion. The gas turbine is used to drive a generator, an aircraft, a ship, a train, etc.

The gas turbine includes a compressor, a combustor, and a turbine. The compressor draws external air thereinto, compresses the air, and transmits it to the combustor. The combustor mixes the compressed air supplied from the compressor with fuel and burns a mixture of the fuel and the compressed air to produce a high temperature and high-pressure combustion gas. The combustion gas produced by the combustion is discharged to the turbine. Turbine blades in the turbine are rotated by the combustion gas, thereby generating power. The generated power is used in various fields, such as generating electric power and actuating machines.

Meanwhile, stress is generated in compressor vanes as the compressor vanes are pressed by the compressed air. For this reason, studies have been conducted on a shape of the compressor vanes to increase a structural stability of the compressor vanes and to improve an aerodynamic performance of the compressor vanes.

SUMMARY

Aspects of one or more exemplary embodiments provide a compressor vane that satisfies high structural stability and high aerodynamic performance, and a compressor and gas turbine having the same.

Additional aspects will be set forth in part in the description which follows and, in part, will become apparent from the description, or may be learned by practice of the exemplary embodiments.

According to an aspect of an exemplary embodiment, there is provided a compressor vane including: a first surface directed toward air introduced into a compressor; a second surface directed in a direction opposite to the first surface; and two tangent lines in which the first and second surfaces meet, wherein a rate of change, with respect to a height of the compressor vane, of a maximum separation distance, between the first surface and the second surface, divided by a distance from one to the other of the two tangent lines in a cross-section at one position of the height of the compressor vane in a direction starting from a portion of the compressor vane closest to a center tie rod and toward a compressor housing varies with the height of the compressor vane away from the portion of the compressor vane closest to the center tie rod.

If the height of the compressor vane changes from an end of the compressor vane closest to the center tie rod to a region of the compressor vane close to the compressor housing, the maximum separation distance, between the first surface and the second surface, divided by the distance from one to the other of the two tangent lines may decrease and then increase.

The height of the compressor vane in the direction starting from the portion of the compressor vane closest to the center tie rod and toward the compressor housing may be divided into three regions including a first region disposed closest to the center tie rod, a second region disposed farther from the center tie rod than the first region, and a third region disposed closest to the housing.

The first region may be a region from the portion of the compressor vane closest to the center tie rod to 25% of a total height of the compressor vane.

The second region may be a region from adjacent to the first region to 75% of the total height of the compressor vane.

The rates of change, with respect to the height of the vane, of the maximum separation distance, between the first surface and the second surface, divided by the distance from one to the other of the two tangent lines in the cross-sections at heights of the respective first, second, and third regions may correspond to a first rate of change, a second rate of change, and a third rate of change. The second rate of change may be greater than the first and third rates of change.

The third rate of change may be greater than the first rate of change.

The first surface may be convex toward the air introduced into the compressor, and the second surface may be concave in the direction opposite to the first surface.

The first and second surfaces may protrude in at least one of the first, second, and third regions.

The first and second surfaces may form a closed curve in cross-section.

The distance from one to the other of the two tangent lines in the cross-section at one position of the height of the compressor vane in the direction starting from the portion of the compressor vane closest to the center tie rod and toward the compressor housing may vary with the height of the compressor vane away from the center tie rod.

The compressor vane may include a plurality of profiles including the first surface, the second surface, and the two tangent lines, and the compressor vane may be formed by stacking the plurality of profiles.

According to an aspect of another exemplary embodiment, there is provided a compressor including: a blade configured to compress air introduced thereinto and to flow the compressed air to a rear; a rotor disk having the blade mounted thereto; a center tie rod disposed through the rotor disk; a vane configured to guide the compressed air to the rear; and a housing in which a plurality of vanes are mounted and configured to define an external appearance of the compressor. The vane may include a first surface directed toward the air introduced into the compressor, a second surface directed in a direction opposite to the first surface, and two tangent lines in which the first and second surfaces meet, wherein a rate of change, with respect to a height of the vane, of a maximum separation distance, between the first surface and the second surface, divided by a distance from one to the other of the two tangent lines in a cross-section at one position of the height of the vane in a direction starting from a portion of the vane closest to the rotor disk and toward the housing varies with the height of the vane away from the portion of the vane closest to the rotor disk.

The vane may protrude from the housing, may include an end disposed closest to the rotor disk, and may be divided into a first region disposed closest to the rotor disk, a second region disposed farther from the rotor disk than the first region, and a third region disposed closest to the housing.

The first region may be a region from the end of the vane to 25% of a total height of the vane, the second region may be a region from an end point of the first region to 75% of the total height of the vane, and the third region may be a rest of the vane.

The rates of change, with respect to the height of the vane, of the maximum separation distance, between the first surface and the second surface, divided by the distance from one to the other of the two tangent lines in the cross-sections at the heights of the respective first, second, and third regions may correspond to a first rate of change, a second rate of change, and a third rate of change. The first rate of change may be smaller than the third rate of change and the third rate of change may be smaller than the second rate of change.

In at least one of the first, second, and third regions of the vane, the first surface may be convex toward the air introduced into the compressor, and the second surface may be concave in the direction opposite to the first surface.

According to an aspect of another exemplary embodiment, there is provided a gas turbine including: a compressor configured to compress air; a combustor configured to mix compressed air supplied from the compressor with fuel for combustion; and a turbine including a plurality of turbine blades rotated by combustion gas discharged from the combustor to generate power. The compressor may include a blade configured to compress the introduced air and to flow the compressed air to a rear, a rotor disk having the blade mounted thereto, a center tie rod disposed through the rotor disk, a vane configured to guide the compressed air to the rear, and a housing in which a plurality of vanes are mounted and configured to define an external appearance of the compressor. The vane may include a first surface directed toward the air introduced into the compressor, a second surface directed in a direction opposite to the first surface, and two tangent lines in which the first and second surfaces meet, wherein a rate of change, with respect to a height of the vane, of a maximum separation distance, between the first surface and the second surface, divided by a distance from one to the other of the two tangent lines in a cross-section at one position of the height of the vane in a direction starting from a portion of the vane closest to the rotor disk and toward the housing varies with the height of the vane away from the portion of the vane closest to the rotor disk.

The vane may protrude from the housing, may have an end disposed closest to the rotor disk, and may be divided into a first region disposed closest to the rotor disk, a second region disposed farther from the rotor disk than the first region, and a third region disposed closest to the housing.

The rates of change, with respect to the height of the vane, of the maximum separation distance, between the first surface and the second surface, divided by the distance from one to the other of the two tangent lines in the cross-sections at the heights of the respective first, second, and third regions may correspond to a first rate of change, a second rate of change, and a third rate of change. The first rate of change may be smaller than the third rate of change and the third rate of change may be smaller than the second rate of change.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
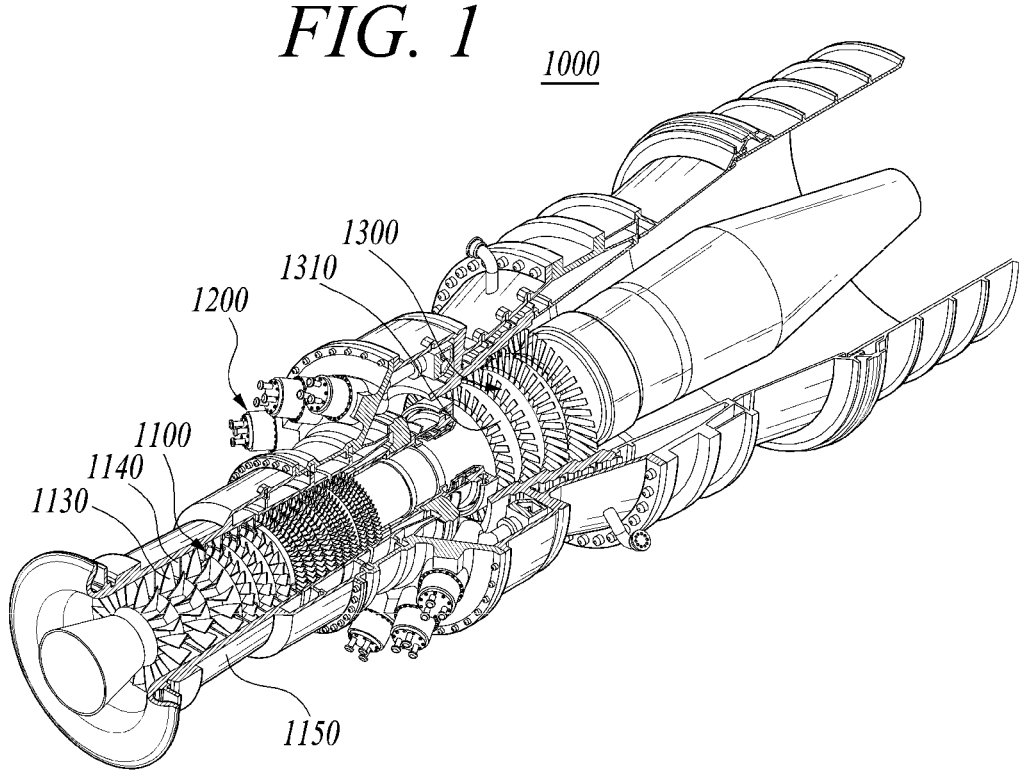
FIG. 1 is a view illustrating an interior of a gas turbine according to an exemplary embodiment.

Various modifications and various embodiments will be described below in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Hereinafter, exemplary embodiments will be described below in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 2:
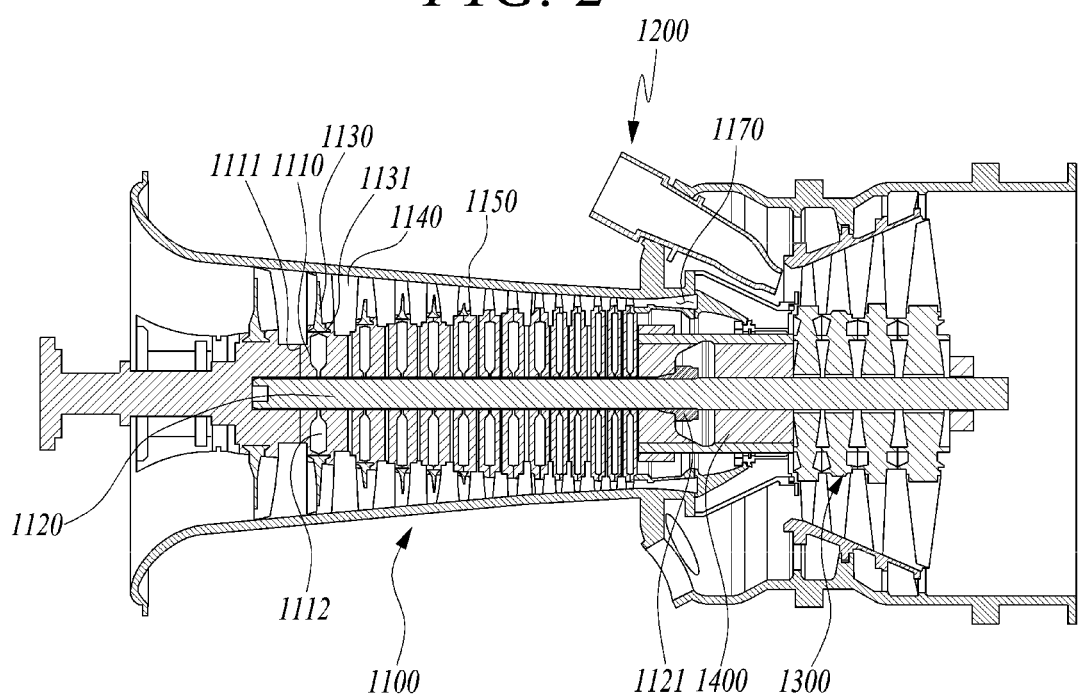
FIG. 2 is a cross-sectional view conceptually illustrating a gas turbine according to an exemplary embodiment.
Figure 3:
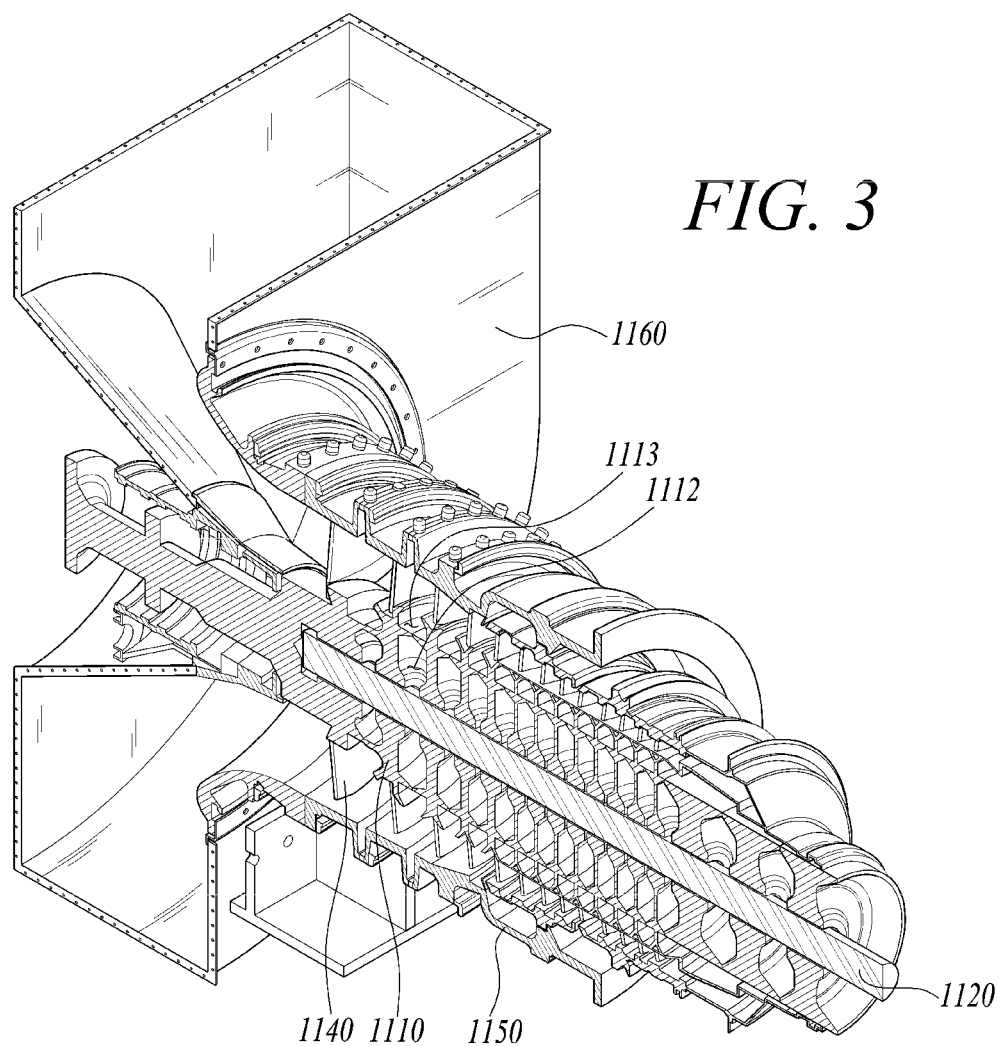
FIG. 3 is a cross-sectional view illustrating a compressor according to an exemplary embodiment.

FIG. 1 is a view illustrating an interior of a gas turbine according to an exemplary embodiment. FIG. 2 is a cross-sectional view conceptually illustrating the gas turbine according to an exemplary embodiment. FIG. 3 is a cross-sectional view illustrating a compressor according to an exemplary embodiment.

Referring to FIGS. 1 to 3, a gas turbine 1000 includes a compressor 1100, a combustor 1200, and a turbine 1300. The compressor 1100 sucks and compresses outside air. The combustor 1200 mixes the compressed air with fuel and burns a mixture thereof. The turbine 1300 includes turbine blades 1310 which are rotated by the combustion gas discharged from the combustor 1200.

The compressor 1100 includes a rotor disk 1110, a center tie rod 1120, a blade 1130, a vane 1140, a housing 1150, an intake 1160, and a diffuser 1170.

The blade 1130 is mounted to the rotor disk 1110, and the center tie rod 1120 is positioned through the rotor disk 1110. The rotor disk 1110 rotates along with a rotation of the center tie rod 1120 to rotate the blade 1130. The rotor disk 1110 may include a plurality of rotor disks.

The plurality of rotor disks 1110 are fastened by the center tie rod 1120 to prevent axial separation in an axial direction of the center tie rod 1120. Each of the plurality of rotor disks 1110 is axially aligned by the center tie rod 1120 passing therethrough. Each of the rotor disks 1110 may have a plurality of protrusions formed on an outer peripheral portion thereof, and may have a flange which is coupled to an adjacent rotor disk 1110 to rotate together therewith.

An air flow channel 1112 may be formed in at least one of the plurality of rotor disks 1110. The air compressed by the blade 1130 of the compressor 1100 may flow through the air flow channel 1112 to the turbine 1300, thereby cooling the turbine blades 1310.

A balancing member may be attached to each rotor disk 1110 for balancing a weight thereof. The balancing member may be, for example, a weight. The attachment of the balancing member may increase a rotational stability of the rotor disk 1110.

The center tie rod 1120 is positioned through the rotor disks 1110 and aligns the rotor disks 1110. The center tie rod 1120 receives torque generated in the turbine 1300 in order to rotate the rotor disks 1110. To this end, a torque tube 1400 may be disposed between the compressor 1100 and the turbine 1300. Here, the torque tube 1400 may be a torque transmission member that transmits the rotational torque, generated in the turbine 1300, to the compressor 1100.

One end of the center tie rod 1120 is fastened to a most upstream rotor disk 1110, and the other end thereof is inserted into the torque tube 1400. The other end of the center tie rod 1120 is fastened to a pressure nut 1121 in the torque tube 1400. The pressure nut 1121 press the torque tube 1400 toward the rotor disks 1110 so that the individual rotor disks 1110 is pressed against each other.

The blade 1130 may include a plurality of blades radially coupled to an outer peripheral surface of each rotor disk 1110. The plurality of blades 1130 may be formed in a multistage manner. Each of the blades 1130 may have a dovetail 1131 fastened to the rotor disk 1110 having slot 1113 into which the dovetail 1131 is inserted. Although the blades 1130 and the rotor disk 1110 are coupled to each other in a dovetail manner in the exemplary embodiment, it is understood that it is not limited thereto. In some cases, the blades 1130 may be coupled to the rotor disk 1110 by using other types of fastening members, such as a key or a bolt.

The blades 1130 rotates along with a rotation of the rotor disk 1110 while compressing air introduced thereinto, so that the compressed air flows to rear-stage vanes 1140. The air is compressed increasingly to a high pressure while passing through the multistage blades 1130.

A plurality of vanes 1140 may be fixedly arranged between each of the rotor disks 1110 in the housing 1150. The vanes 1140 guide the flow of the compressed air moved from front-stage compressor blades 1130 to rear-stage compressor blades 1130. Here, at least a portion of the plurality of vanes 1140 may be mounted to be rotatable within a fixed range for regulating a rate of inflow of air, or the like.

The housing 1150 defines an external appearance of the compressor 1100. The housing 1150 accommodates therein the rotor disks 1110, the center tie rod 1120, the blades 1130, the vanes 1140, and so on.

A connection pipe may be formed in the housing 1150 to cool the turbine blades 1310 in such a manner that the air compressed by the multistage compressor blades 1130 flows to the turbine 1300.

The intake 1160 positioned at an inlet of the compressor 1100 is used to introduce outside air into the compressor 1100. The diffuser 1170 is disposed at an outlet of the compressor 1100 to allow the compressed air to diffuse and flow. Before the compressed air is supplied to the combustor 1200, the diffuser 1170 rectifies the compressed air and converts some of the kinetic energy of the compressed air into a static pressure. The compressed air passing through the diffuser 1170 is introduced into the combustor 1200.

Figure 4:
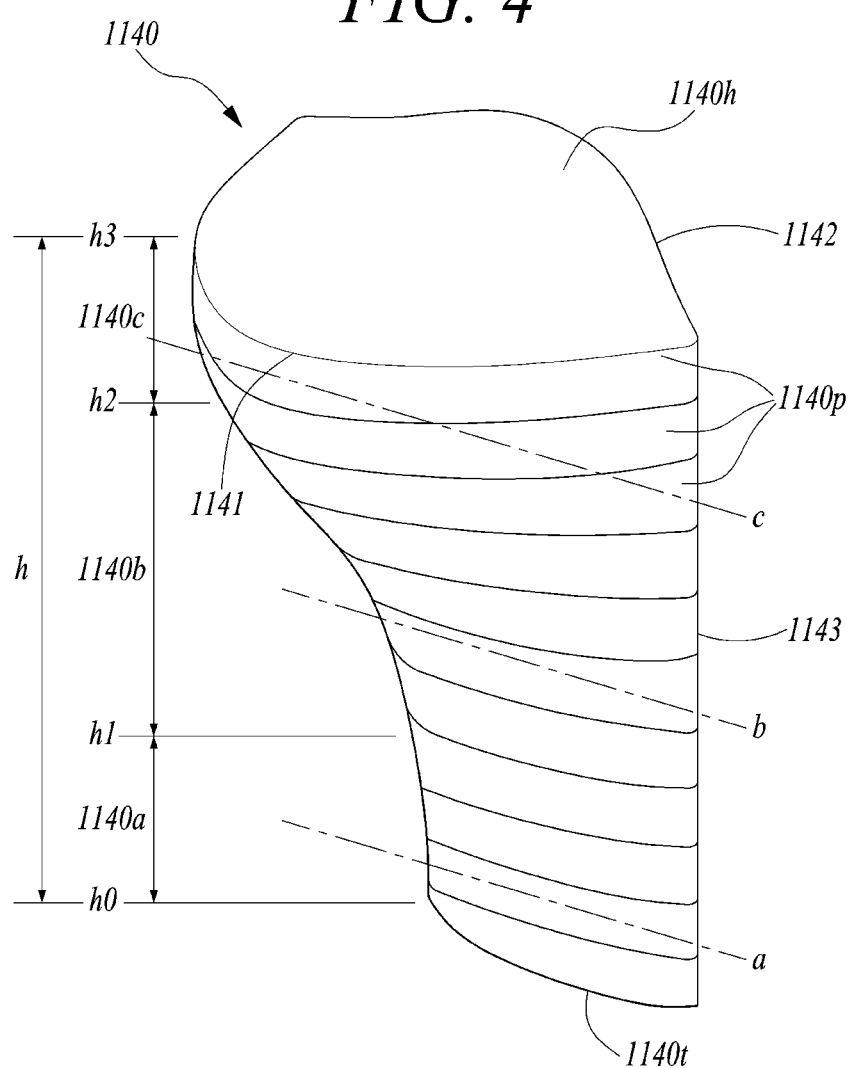
FIG. 4 is a view illustrating a vane according to an exemplary embodiment.
Figure 5A:
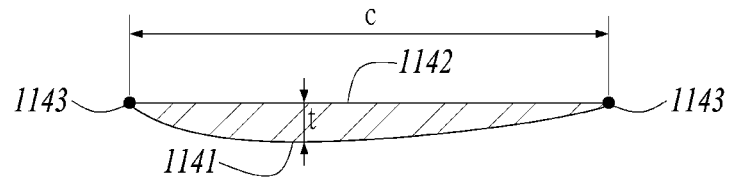
FIGS. 5A to 5C are cross-sectional views of the vane illustrated in FIG. 4 at each height of the vane.
Figure 5B:
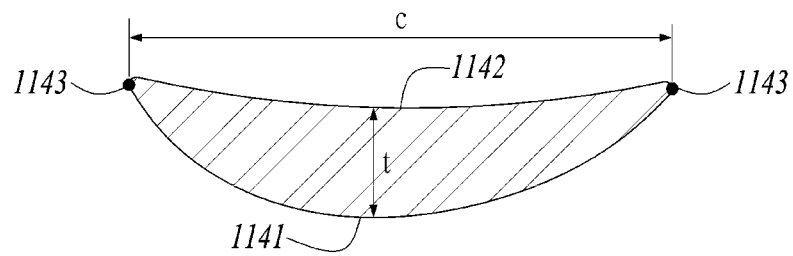
Figure 5C:
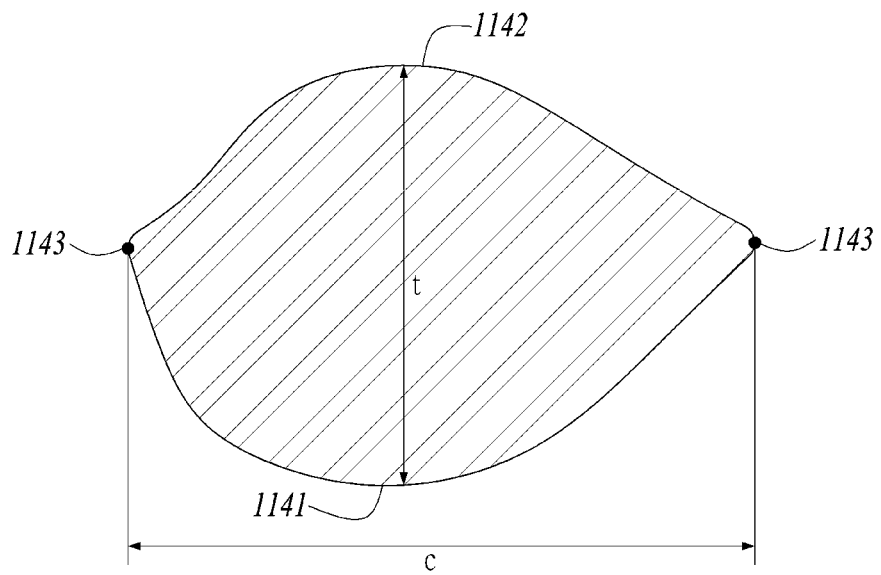

FIG. 4 is a view illustrating one vane according to an exemplary embodiment. FIGS. 5A to 5C are cross-sectional views of the vane illustrated in FIG. 4 at each height of the vane. Meanwhile, FIG. 4 illustrates that the housing connected to the vane is removed for convenience of description.

Referring to FIG. 4, the vane 1140 includes a vane top 1140$h$ and a vane bottom 1140$t$, which have different cross-sectional areas. The vane top 1140$h$ is connected to the housing 1150. That is, the vane 1140 may protrude from an inner surface of the housing 1150. The vane bottom 1140$t$ is disposed close to the center tie rod 1120. That is, the vane bottom 1140$t$ is disposed close to an associated rotor disk 1110. The vane top 1140$h$ may be disposed adjacent to a shroud. The vane bottom 1140$t$ may be a hub.

A side of the vane 1140 may include a first surface 1141 directed toward the air introduced into the compressor 1100, a second surface 1142 directed in a direction opposite to the first surface 1141, and two tangent lines 1143 in which the first and second surfaces 1141 and 1142 meet.

The first surface 1141 is directed toward the air introduced into the compressor 1100, so that the air flows along a surface of the first surface 1141 to a rear of the compressor 1100 while be compressed. In this case, stress is generated in the vane 1140 as the compressed air presses the first surface 1141 of the vane 1140.

The second surface 1142 is directed in the direction opposite to the first surface 1141. In order to increase aerodynamic performance while the compressed air flows to the rear of the compressor 1100, the second surface 1142 may be convex or concave according to a height of the vane 1140.

The tangent lines 1143 are at points in which the first and second surfaces 1141 and 1142 meet. The tangent lines 1143 may be curved due to the shape of the first and second surfaces 1141 and 1142 according to the height of the vane 1140.

The vane 1140 may be divided into three regions. For example, the vane 1140 may include a first region 1140$a$, a second region 1140$b$, and a third region 1140$c$, which are sequentially arranged in a direction starting from the portion of the vane 1140 closest to the center tie rod 1120 and toward the housing 1150. Here, an end of the vane bottom 1140$t$ may be referred to as a lowest point h0, and an end of the vane top 1140$h$ may be referred to as a highest point h3.

The first region 1140a may be disposed closest to the center tie rod 1120. That is, the first region 1140a starts from the lowest point h0. The second region 1140b may be disposed farther from the center tie rod 1120 than the first region 1140a. The third region 1140c is disposed closest to the housing 1150.

Referring to FIG. 5A, a maximum separation distance between the first surface 1141 and the second surface 1142 in the cross-section of the vane 1140 may be referred to as a thickness t in the corresponding cross-section. A distance from one to the other of the two tangent lines 1143 in the cross-section of the vane 1140 may be referred to as a chord c.

In the exemplary embodiment, a rate of change, with respect to a height of the vane 1140, of the thickness t divided by the chord c in any cross-section of the vane 1140 varies nonlinearly. That is, the rate of change, with respect to the height of the vane 1140, of the maximum separation distance, between the first surface 1141 and the second surface 1142, divided by the distance from one to the other of the two tangent lines 1143 in the cross-section at one position of the height of the vane 1140 in the direction starting from the end of the vane 1140 closest to the center tie rod 1120 and toward the housing 1150 varies with the height of the vane 1140 away from the portion of the vane 1140 closest to the center tie rod 1120.

In this case, the rate of change, with respect to the height of the vane 1140, of the thickness t divided by the chord c in one cross-section of the vane 1140 may increase from the lowest point h0 to the highest point h3, and then decrease again. That is, as the height of the vane 1140 changes from the end of the vane 1140 closest to the center tie rod 1120 to the region of the vane 1140 close to the housing 1150, the maximum separation distance, between the first surface 1141 and the second surface 1142, divided by the distance from one to the other of the two tangent lines 1143 may increase and then decrease.

In this case, a height of the first region 1140a may be about 25% of a total height h of the vane 1140. For example, the first region 1140a may be a region from the lowest point h0, which is closest to the center tie rod 1120, to 25% of the total height h of the vane 1140. However, for design reasons or the like, the height of the first region 1140a may be 20 to 30% of the total height h of the vane 1140.

A height of the second region 1140b may be about 75% of the total height h of the vane 1140. For example, the second region 1140b may be a region from the first region 1140a to 75% of the total height h of the vane 1140. For example, if the height of the first region 1140a is 25% of the total height h of the vane 1140 (i.e., from h0 to h1), the height of the second region 1140b starts from 25% of the total height h of the vane 1140 and up to 75% of the total height h of the vane 1140 (i.e., from h1 to h2). However, for design reasons or the like, the height of the second region 1140b may starts from 25% of the total height h of the vane 1140 and up to 70 to 80% of the total height h of the vane 1140.

The third region 1140c may be from the second region 1140b to the highest point h3.

FIG. 5A is a cross-sectional view illustrating the first region 1140a, FIG. 5B is a cross-sectional view illustrating the second region 1140b, and FIG. 5C is a cross-sectional view illustrating the third region 1140c.

Referring to FIGS. 5A to 5C, the first and second surfaces 1141 and 1142 may form a closed curve in cross-section. As illustrated in FIGS. 5A and 5B, the first surface 1141 may be convex toward the air introduced into the compressor 1100, and the second surface 1142 may be concave in the direction opposite to the first surface 1141.

The first surface 1141 may protrude toward the air introduced into the compressor 1100, in common in the first, second, and third regions 1140a, 1140b, and 1140c.

The second surface 1142 may protrude in at least one of the first, second, and third regions 1140a, 1140b, and 1140c. For example, the second surface 1142 may be concave in the direction opposite to the first surface 1141 in the first and second regions 1140a and 1140b, and the second surface 1142 may protrude at least partially in the direction opposite to the first surface 1141 in the third region 1140c.

In addition, the chord c in cross-section of the vane 1140 may change according to the height of the vane 1140. That is, the distance from one to the other of the two tangent lines 1143 in the cross-section at one position of the height of the vane 1140 in the direction starting from the portion of the vane 1140 closest to the center tie rod 1120 and toward the housing 1150 may change according to the height of the vane 1140 away from the center tie rod 1120. For example, as the height of the vane 1140 increases, the chord c may increase in length.

That is, the chord c in cross-section of the vane 1140 at a point close to the highest point of the vane may be greater than the chord c in cross-section of the vane 1140 at a point distant from the highest point of the vane. This is because the vane 1140 may be thicker as it gets closer to the housing 1150.

According to the exemplary embodiment as described above, because the thickness t divided by the chord c in the cross-section of the vane 1140 changes nonlinearly according to the height of the vane 1140, it is possible to satisfy the structural stability and high aerodynamic performance of the vane 1140.

Meanwhile, the vane 1140 may include a plurality of profiles 1140p including the first surface 1141, the second surface 1142, and the two tangent lines 1143. That is, the vane 1140 may include a plurality of profiles 1140p that may be segmented from and coupled to each other in the cross-sectional direction thereof. The vane 1140 may be formed by stacking the above profiles 1140p.

As illustrated in FIG. 4, one vane 1140 may be formed by mutually stacking the plurality of profiles 1140p, which may be segmented from and coupled to each other in the cross-sectional direction thereof, in the direction of height of the vane 1140. In this case, each of the profiles 1140p may have a different thickness t and chord c between the first surface 1141 and the second surface 1142 in each cross-section of the profiles 1140p.

Figure 6A:
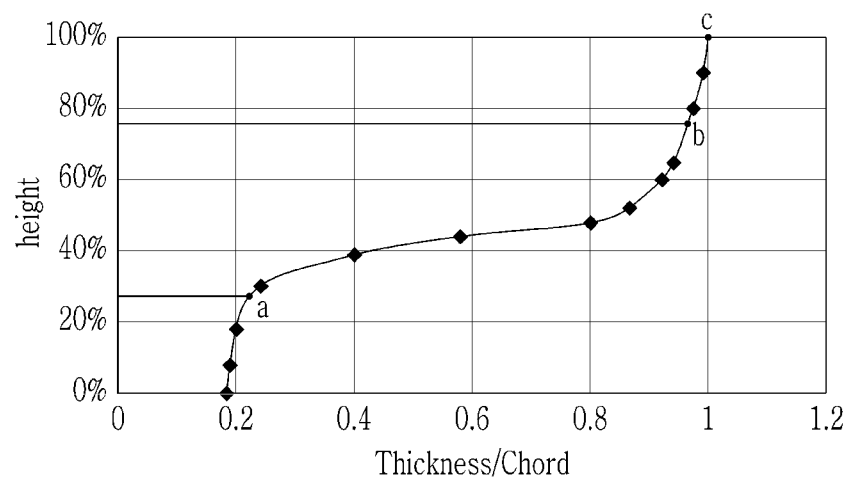
FIG. 6A is a graph illustrating a ratio of thickness to chord with respect to a height of the compressor vane according to an exemplary embodiment.
Figure 6B:
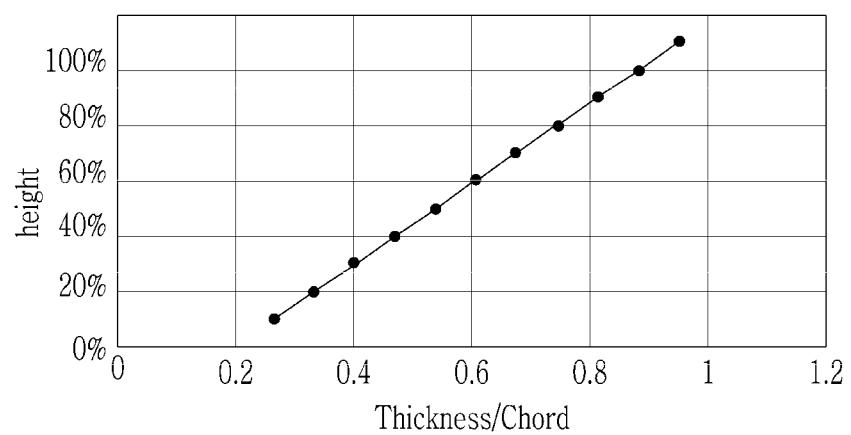
FIG. 6B is a graph illustrating a ratio of thickness to chord with respect to a height of a typical compressor vane.

FIG. 6A is a graph illustrating a ratio of thickness t to chord c with respect to the height of the compressor vane 1140 according to an exemplary embodiment. FIG. 6B is a graph illustrating a ratio of thickness t to chord c with respect to the height of a typical compressor vane.

Referring to FIG. 6A, a horizontal axis of the graph refers to the thickness t divided by the chord c of the vane 1140, which may be expressed as a thickness t-chord c ratio. A vertical axis of the graph refers to the height of the vane 1140. In this case, the lowest point of the vane is 0%, and the highest point of the vane is 100%.

Here, the thickness t-chord c ratio at the lowest point of the vane is smaller than approximately 0.2.

The rates of change, with respect to the height of the vane 1140, of the thickness t-13 chord c ratio in the first, second, and third regions 1140a, 1140b, and 1140c may be referred to as a first rate of change, a second rate of change, and a third rate of change, respectively. That is, the rates of change, with respect to the height of the vane 1140, of the maximum separation distance, between the first surface 1141 and the second surface 1142, divided by the distance from one to the other of the two tangent lines 1143 in the cross-sections at the heights of the respective first, second, and third regions 1140a, 1140b, and 1140c may be referred to as a first rate of change, a second rate of change, and a third rate of change, respectively. The second rate of change may be greater than the first and third rates of change.

For example, at a point a in the height of the first region 1140a, the thickness t-chord c ratio is approximately 0.25. In the first region 1140a, the thickness t-chord c ratio on the horizontal axis is increased by about 0.05, and the height of the vane 1140 on the vertical axis is increased by about 25%. Therefore, an average slope of the graph in the first region 1140a may be approximately 5 (i.e., 0.25/0.05).

At a point b in the height of the second region 1140b, the thickness t-chord c ratio is approximately 0.9. In the second region 1140b, the thickness t-chord c ratio on the horizontal axis is increased by about 0.7, and the height of the vane 1140 on the vertical axis is increased by about 50%. Therefore, an average slope of the graph in the second region 1140b may be approximately 1.4 (i.e., 0.7/0.5).

At a point c in the height of the third region 1140c, the thickness t-chord c ratio is approximately 1. In the third region 1140c, the thickness t-chord c ratio on the horizontal axis is increased by about 0.1, and the height of the vane 1140 on the vertical axis is increased by about 25%. Therefore, an average slope of the graph in the third region 1140c may be approximately 2.5 (i.e., 0.25/0.1). That is, a difference between the average slopes in the second, first, and third regions 1140b, 1140a and 1140c may be between about 4 times and 8 times.

That is, the second rate of change in the second region 1140b may be greater than the first and third rates of change. The first rate of change may be greater than the third rate of change. However, for design reasons or the like, the third rate of change may be similar to or greater than the first rate of change.

According to the exemplary embodiment, the first rate of change of the thickness t divided by the chord c in the cross-section of the first region 1140a of the vane 1140 is smaller than the second rate of change in the second region 1140b, and the third rate of change in the third region 1140c is smaller than the second rate of change in the second region 1140b, so that the stress applied to the vane 1140 is reduced. Thus, the structural stability and aerodynamic performance of the vane 1140 can be increased, resulting in an enhancement in aerodynamic performance of the gas turbine.

On the other hand, referring to FIG. 6B, the change of the height of the vane on the vertical axis with respect to the thickness t-chord c ratio on the horizontal axis is constant. That is, as the height of the vane increases, the thickness t-chord c ratio increases at a constant rate. Specifically, the thickness t-chord c ratio increases or decreases linearly according to the height of the vane. In such a structure, the structural stress is increased compared to the vane whose thickness t-chord c ratio changes nonlinearly, with the consequence that the efficiency for aerodynamic performance is also low.

In experiments with the structural stability and aerodynamic performance of the vane according to FIG. 6A, the average value of the stress applied to the vane is 138.29 MPa, the maximum stress value of the vane is 1143.9 MPa, and the aerodynamic performance (efficiency) of the vane is 92.802%. In experiments with the structural stability and aerodynamic performance of the vane according to FIG. 6B, the average value of the stress applied to the vane is 141.85 MPa, the maximum stress value of the vane is 1183.4 MPa, and the aerodynamic performance (efficiency) of the vane is 92.786%.

That is, the average stress value and maximum stress value of the vane according to FIG. 6A are further reduced compared to those of the vane according to FIG. 6B, and the aerodynamic performance (efficiency) of the vane is improved. For example, the efficiency of the vane is increased by about 0.016%, and the efficiency of the compressor can thus be increased by 0.016%. In this case, the overall efficiency of the gas turbine is improved by about 0.0053%. In terms of power consumption efficiency, the economic life of the gas turbine or combined power generation can be increased by 20 to 30 years, which results in a saving of approximately 500 to 800 million won.

According to the exemplary embodiments, because the thickness divided by the chord in the cross-section of the vane changes nonlinearly, it is possible to satisfy the structural stability and aerodynamic performance of the vane.

According to the exemplary embodiments, the first rate of change of the thickness divided by the chord in the cross-section of the first region of the vane is greater than the second rate of change in the second region, and the third rate of change in the third region is greater than the second rate of change in the second region, so that the stress applied to the vane is reduced. Thus, the structural stability and aerodynamic performance of the vane can be improved, resulting in an enhancement in aerodynamic performance of the gas turbine.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A compressor vane comprising:
    a vane bottom and a vane top;
    a first surface facing compressed air moved from a front stage;
    a second surface directed in a direction opposite to the first surface; and
    two tangent lines in which the first and second surfaces meet, each of the two tangent lines extending between the vane bottom and the vane top,
    wherein a height of the compressor vane in a direction starting from the vane bottom to the vane top is divided into a first region disposed closest to the vane bottom; a second region disposed farther from the vane bottom than the first region; and a third region disposed closest to the vane top,
    wherein a rate of change, with respect to the height of the compressor vane, of a maximum separation distance, between the first surface and the second surface, divided by a distance from one to the other of the two tangent lines in a cross-section at heights of the respective first, second, and third regions correspond to a first rate of change, a second rate of change, and a third rate of change; and
    the second rate of change is greater than the first and third rates of change and the third rate of change is greater than the first rate of change.

2. The compressor vane according to claim 1, wherein the first region is a region from the vane bottom to 25% of a total height of the compressor vane.

3. The compressor vane according to claim 2, wherein the second region is a region from adjacent to the first region to 75% of the total height of the compressor vane.

4. The compressor vane according to claim 1, wherein:
the first surface is convex toward the air introduced into the compressor vane; and
the second surface is concave in the direction opposite to the first surface.

5. The compressor vane according to claim 4, wherein the first and second surfaces protrude in at least one of the first, second, and third regions.

6. The compressor vane according to claim 5, wherein the first and second surfaces form a closed curve in cross-section.

7. The compressor vane according to claim 1, wherein the distance from one to the other of the two tangent lines in the cross-section at one position of the height of the compressor vane in the direction starting from the vane bottom to the vane top varies with the height of the compressor vane.

8. The compressor vane according to claim 1, wherein:
the compressor vane includes a plurality of profiles comprising the first surface, the second surface, and the two tangent lines; and
the compressor vane is formed by stacking the plurality of profiles.

9. A compressor including multiple stages having a plurality of vanes and a plurality of blades, the compressor comprising:
a blade of the plurality of blades configured to compress air introduced thereinto and to flow the compressed air to a rear stage;
a rotor disk having the blade mounted thereto;
a center tie rod disposed through the rotor disk;
a vane of the plurality of vanes configured to guide the compressed air to the rear stage; and
a housing in which the plurality of vanes are mounted and configured to define an external appearance of the compressor, wherein the vane comprises:
a first surface directed toward the air introduced into the compressor;
a second surface directed in a direction opposite to the first surface; and
two tangent lines in which the first and second surfaces meet,
wherein the vane protrudes from the housing, includes an end disposed closest to the rotor disk, and is divided into a first region disposed closest to the rotor disk; a second region disposed farther from the rotor disk than the first region; and a third region disposed closest to the housing,
wherein a rate of change, with respect to a height of the vane, of a maximum separation distance, between the first surface and the second surface, divided by a distance from one to the other of the two tangent lines in a cross-section at one position of the height of the respective first, second, and third regions correspond to a first rate of change, a second rate of change, and a third rate of change; and
the first rate of change is smaller than the third rate of change and the third rate of change is smaller than the second rate of change.

10. The compressor according to claim 9, wherein:
the first region is a region from the end of the vane to 25% of a total height of the vane;
the second region is a region from an end point of the first region to 75% of the total height of the vane; and
the third region is a rest of the vane.

11. The compressor according to claim 9, wherein in at least one of the first, second, and third regions of the vane, the first surface is convex toward the air introduced into the compressor, and the second surface is concave in the direction opposite to the first surface.

12. The compressor according to claim 11, wherein the first and second surfaces form a closed curve in cross-section.

13. The compressor according to claim 9, wherein the distance from one to the other of the two tangent lines in the cross-section at one position of the height of the compressor vane in the direction starting from the portion of the compressor vane closest to the center tie rod and toward the compressor housing varies with the height of the compressor vane.

14. A gas turbine comprising:
a compressor including multiple stages having a plurality of vanes and a plurality of blades and configured to compress air;
a combustor configured to mix compressed air supplied from the compressor with fuel for combustion; and
a turbine comprising a plurality of turbine blades rotated by combustion gas discharged from the combustor to generate power, wherein the compressor comprises:
a blade of the plurality of blades configured to compress the introduced air and to flow the compressed air to a rear stage;
a rotor disk having the blade mounted thereto;
a center tie rod disposed through the rotor disk;
a vane of the plurality of vanes configured to guide the compressed air to the rear stage; and
a housing in which the plurality of vanes are mounted and configured to define an external appearance of the compressor, wherein the vane comprises:
a first surface directed toward the air introduced into the compressor;
a second surface directed in a direction opposite to the first surface; and
two tangent lines in which the first and second surfaces meet,
wherein the vane the vane protrudes from the housing, includes an end disposed closest to the rotor disk, and is divided into a first region disposed closest to the rotor disk; a second region disposed farther from the rotor disk than the first region; and a third region disposed closest to the housing,
wherein a rate of change, with respect to a height of the vane, of a maximum separation distance, between the first surface and the second surface, divided by a distance from one to the other of the two tangent lines in a cross-section at one position of the height of the respective first, second, and third regions correspond to a first rate of change, a second rate of change, and a third rate of change; and
the first rate of change is smaller than the third rate of change and the third rate of change is smaller than the second rate of change.

15. The gas turbine according to claim 14, wherein in at least one of the first, second, and third regions of the vane, the first surface is convex toward the air introduced into the compressor, and the second surface is concave in the direction opposite to the first surface.

16. The gas turbine according to claim 15, wherein the first and second surfaces form a closed curve in cross-section.

17. The gas turbine according to claim 14, wherein the distance from one to the other of the two tangent lines in the cross-section at one position of the height of the compressor vane in the direction starting from the portion of the compressor vane closest to the center tie rod and toward the compressor housing varies with the height of the compressor vane.

* * * * *